United States Patent [19]
DeCoster et al.

[11] Patent Number: 6,103,994
[45] Date of Patent: Aug. 15, 2000

[54] WELDING DEVICE WITH REMOTE DEVICE DETECTION

[75] Inventors: Albert J. DeCoster, Kaukauna; Stephen P. Ferkel, Appleton, both of Wis.

[73] Assignee: Illinois Tool Works, Glenview, Ill.

[21] Appl. No.: 09/289,996

[22] Filed: Apr. 12, 1999

[51] Int. Cl.[7] .................................................. B23K 9/10
[52] U.S. Cl. ...................................... 219/132; 219/130.5
[58] Field of Search ................................ 219/132, 130.1, 219/130.5, 137 PS, 130.4, 98

[56] References Cited

U.S. PATENT DOCUMENTS

| | | | |
|---|---|---|---|
| 2,597,689 | 5/1952 | Welch, Jr. | 219/130.4 |
| 2,872,566 | 2/1959 | Leppala | 219/132 |
| 3,278,835 | 10/1966 | Hart | 323/94 |
| 4,216,367 | 8/1980 | Risberg | 219/132 |
| 4,415,792 | 11/1983 | Jordan | 219/98 |
| 5,208,436 | 5/1993 | Blankenship | 219/130.1 |
| 5,278,390 | 1/1994 | Blankenship | 219/132 |
| 5,777,295 | 7/1998 | Kneisley et al. | 219/132 |
| 5,864,117 | 1/1999 | Kneisley et al. | 219/132 |

*Primary Examiner*—Clifford C. Shaw
*Attorney, Agent, or Firm*—Foley & Lardner

[57] ABSTRACT

A welding device is disclosed having a remote control device configured to control an operating parameter of the welding device (e.g., welding current) and a control circuit to receive a remote device signal from the remote control device and to determine the type of remote control device based on the remote device signal. Remote devices may be "trigger only", "hand control", "fingertip control" or "foot control" devices. The welding device further includes an operating parameter selector (e.g., welding amperage) and a welding process selector (e.g., TIG, STICK) mounted on a control panel. The control circuit receives an operating parameter selector signal from the operating parameter selector and a welding process selector signal from the welding process selector, and controls an operating parameter with one of the remote device signal and the operating parameter selector signal based on the welding process selector signal. The control circuit also selectively disables adjustment of the operating parameter selector when controlling the operating parameter with the remote device signal.

24 Claims, 3 Drawing Sheets

WELDING DEVICE WITH REMOTE DEVICE DETECTION

FIELD OF THE INVENTION

The present invention relates generally to welding equipment and, more specifically, to welding power supplies. More specifically, the present invention relates to welding power supplies having optional remote device control.

BACKGROUND OF THE INVENTION

Many methods of welding are known in the art, each with its own advantages and disadvantages. Common welding processes include gas welding, oxyacetylene brazing and soldering, shielded metal arc welding (SMAW) or "STICK" welding, metal inert gas (MIG) or "wire feed" welding, and gas tungsten arc welding (GTAW) or "TIG" welding. Known welding power supplies provide the necessary welding power, gas supply, and other welding inputs needed to perform one or more of the various welding processes. While the present invention will be described with reference to a welding device having TIG and STICK capabilities, one skilled in the art will appreciate that the present invention may have applications in many other welding power supplies.

Since most welding power supplies are designed to be operated by a human operator, various types of remote control devices adapted for human interface have been introduced to facilitate operator control of the welding processes. The art of welding often requires the operator to select and adjust numerous operating parameters of the welding device, including, the welding process itself, the flow of shielding gas to the weld site and, in some welding processes, various characteristics of the welding arc (e.g., current or amperage, pulse frequency, initial slope, final slope, etc.). These operating parameters can be adjusted using parameter selectors on the control panel of the welding device. Some of the adjustments, however, are more conveniently made by employing a remote control device to control, for example, the beginning and end of a welding cycle and/or the current of the welding arc (i.e., the welding current). For example, in a TIG welding process, a trigger on a fingertip control remote device is pressed to begin a welding cycle, varied through a range of positions to control the magnitude of the welding current, then released to end the welding cycle.

Numerous types of remote devices exist in the art, and others have yet to be developed. The present invention will find applications with all types of remote devices. A "trigger only" remote device is either a foot or hand control device including a simple on/off switch. A "hand control" remote device includes a box having a potentiometer including an operator input device (e.g., a dial) to control an operating parameter, and a switch independently coupled to the box to provide an on/off signal. A "fingertip control" or "foot control" remote device, as used herein, includes a "switchpot", i.e., a potentiometer and a switch tied together such that movement of an operator input device controls both the switch and the potentiometer. Both the hand control remote device and the fingertip/foot control remote devices are capable of controlling an operating parameter, such as, welding current, over a range of values.

While the addition of a remote control device to a welding device can add convenience and flexibility to the welding process, it can also add confusion to the operator over which control device is actually controlling the operating parameter. In one prior art welding device, an operating parameter selector, including a panel-mounted knob coupled to a potentiometer, is coupled through a high-impedance series resistor to a control circuit. By adjusting the knob, the operator varies an operating parameter control signal provided to the control circuit. When a remote device, having a potentiometer with a relatively low impedance, is coupled in parallel with the selector and high-impedance resistor, current travels preferably through the lower impedance potentiometer of the remote device, allowing the remote device to control the operating parameter. However, if the operator leaves the welding device and later returns, the operator may not notice that the remote device is still coupled to the welding device and may attempt to adjust the operating parameter using the panel-mounted knob.

Another limitation of the prior art occurs when the operator wishes to switch from a TIG welding process using an attached fingertip or foot control remote device to a STICK welding process. STICK welding typically cannot be done with a fingertip or foot control remote device. Accordingly, the operator must always remember to remove the remote device from the welding device when switching from a TIG welding process to a STICK welding process or actuate another switch on the control panel. With increased productivity demands of professional welders, the welder can forget to remove the remote device when switching from one process to another which, again, results in operator confusion and bad welds.

In another known system, a control circuit is provided for sensing when a remote potentiometer is electrically connected therewith and disconnected therefrom. The control circuit includes a switching arrangement for receiving a first control signal from a local current setting device and a second control signal from a remote current setting device. The control circuit selectively connects one of the first and second control signals with a power supply and disconnects the other of the first and second control signals with the power supply based on whether the remote current setting device is coupled to the control circuit. This system, however, has several limitations. First, the system cannot detect the type of remote device coupled to the power supply; it can only determine whether or not any remote device is coupled to the power supply. Second, the system utilizes costly switching elements (e.g., relays) to electrically isolate portions of the control circuit to selectively connect and disconnect the control signals to the power supply. Also, the system requires a STICK/TIG switch to physically disconnect the remote control device during STICK welding.

Yet another limitation of the prior art is that known hand control remote devices do not clearly identify the magnitude of the operating parameter they are controlling. Thus, setting the dial of the hand control at the middle of its range of motion does not necessarily indicate 50% of the maximum value of the operating parameter. Therefore, the operator receives no accurate indication from the hand control and power source of how much welding current is being provided to the welding arc.

What is needed is an improved welding device that overcomes these and other limitations of prior welding power supplies. The improved welding device would have the capability to determine not just whether a remote device exists, but what type of remote device is coupled to the welding device. The improved welding device also would be substantially free of relays and other expensive switching circuitry. The improved welding device would further include sufficient intelligence to select which of local and remote control signals controls the welding current based on a selected welding process.

SUMMARY OF THE INVENTION

These and other needs are accomplished by the method and apparatus of the present invention in which, according to one exemplary embodiment, a method for controlling an operating parameter of a welding device is provided. The method includes receiving a welding process selector signal from a welding process selector, the welding process selector signal representing a desired welding process; receiving a remote device signal from a remote control device, the remote device signal representing a first desired value of the operating parameter; receiving an operating parameter selector signal from an operating parameter selector, the operating parameter selector signal representing a second desired value of the operating parameter; and controlling the operating parameter with the remote device signal when the welding process selector signal indicates a first welding process is desired and with the operating parameter selector signal when the welding process selector signal indicates a second welding process is desired.

According to another exemplary embodiment of the present invention, a welding device is disclosed for providing a welding input to a welding site. The welding device includes a control circuit having an input to receive a remote device signal from a remote control device. The control circuit determines the type of remote control device based on the remote device signal.

According to yet another exemplary embodiment of the present invention, a welding device is disclosed for providing a welding input to a welding site. The welding device includes an operating parameter selector to adjust an operating parameter of the welding device. The welding device further includes a control circuit in communication with the operating parameter selector. The control circuit has an input to receive a remote device signal from a remote control device. The control circuit selectively enables and disables selection of a desired value of the operating parameter using the parameter selector based on the remote device signal.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF THE PREFERRED EMBODIMENTS

Figure 1:
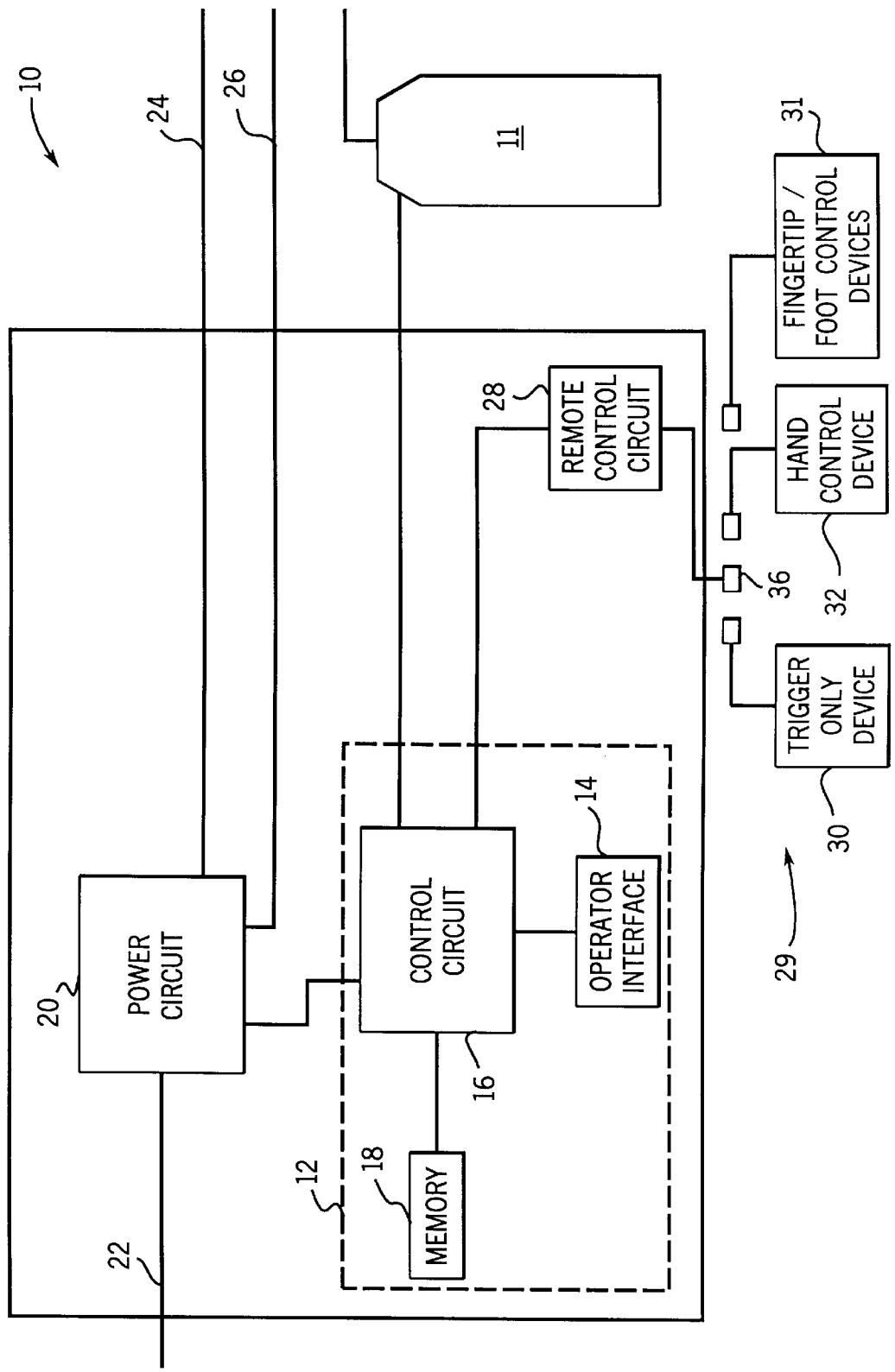
FIG. 1 is a block diagram of one of a number of possible embodiments of a welding device according to the present invention.

Referring to FIG. 1, a welding device 10 according to one of a number of possible embodiments of the present invention is shown and described. Device 10 includes a shielding gas source 11 and a control interface 12 which comprises an operator interface 14, a control circuit 16 and a memory 18. Control circuit 16 (e.g., a microprocessor or microcontroller, such as, an Intel 80C196KD-20 microprocessor) includes a plurality of digital and analog inputs and outputs for controlling various functions of device 10. Control circuit 16 may alternatively be comprised of discrete electrical components, analog circuitry, etc. Control circuit 16 receives signals from operator interface 14 representing various operator inputs, as will be described hereinafter with reference to FIG. 2, and further provides output signals to operator interface 14 to enable and disable interface options and to display selected operating parameters. Control circuit 16 is coupled to memory 18 (e.g., RAM, ROM, EPROM, or some combination thereof) to load therefrom and store thereon information representing various welding processes and parameters.

Device 10 further includes a power circuit 20 which applies well-known power conditioning to an input power signal received at a power input terminal 22 and provides a welding power at a power output terminal 24. For example, power conditioning may be performed by a phase-controlled rectifier circuit or by other well-known power converter or inverter topologies. The particular selected power conditioning circuit device or means is not consequential to the invention. Welding power returns to power circuit 20 via a reference terminal 26. Control circuit 16 is coupled to power circuit 20 to control the power conditioning processes according to, for example, operator inputs received from operator interface 14. For example, control circuit 16 may cause power circuit 20 to generate a pulsed welding power having a pulse frequency selected by an operator via a pulse frequency selector on operator interface 14. Power output terminal 24 may be coupled to a stick electrode (not shown) for STICK welding and a torch (not shown) for TIG welding. Reference terminal 26 may be coupled to a work clamp (not shown).

Device 10 further includes a remote control circuit 28. Control circuit 16 receives remote device signals from one or more of a plurality of remote control devices 29, such as, a trigger only device 30, a fingertip control device or a foot control device 31 and a hand control device 32. Remote control devices 29 are user-operable and can be used to control welding inputs, such as, welding power output and gas flow output. Various types of remote control devices 29 can be used to start and/or stop the provision of a welding power at power output terminal 24, start and/or stop the provision of a shielding gas, and/or to control the welding current over a range of currents based on the degree to which a trigger or pedal is engaged. Remote control devices 29 add significant convenience to operator control over the welding process.

Devices 29 may be coupled to device 10 via a remote connector 36. According to one advantageous aspect of the present invention, control circuit 16 detects the type of remote device that is coupled to remote connector 36 by receiving a remote device signal from one or more of remote devices 29 through remote control circuit 28 and determining the type of remote device based on the received remote device signal. This advantageous aspect of the present invention will be described in greater detail below and in further detail with reference to FIG. 3.

Figure 2:
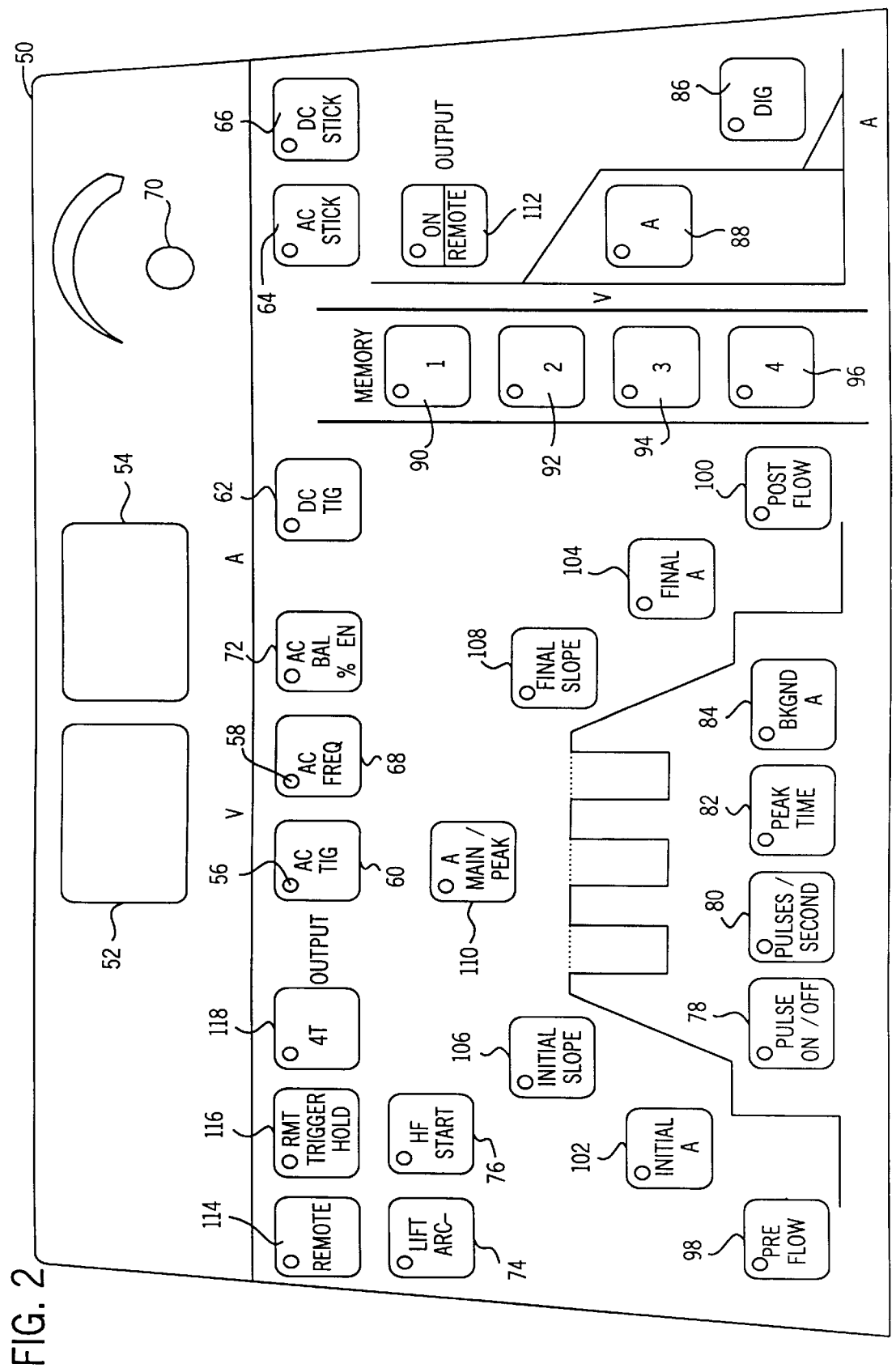
FIG. 2 is a control panel for the welding device of FIG. 1 according to one of a number of possible exemplary embodiments of the present invention.

Referring now to FIG. 2, an exemplary form of a control panel 50 for the operator interface 14 of FIG. 1 is shown. Control panel 50 includes a plurality of selectors (discussed below) for adjusting the various operating parameters of device 10 and a plurality of indicia, such as, multi-purpose displays 52, 54 for indicating amperage, voltage and other operating parameters and light emitting diodes (LEDs) 56, 58 for indicating selected or preferred parameter settings. "Selector", as used herein, includes any or a combination of a plurality of selectors, such as analog, digital, discrete-position analog, toggle, dial and rotary, membranes and discrete push-button switches, and displays having a number of options from which the operator may select by, for example, clicking with a mouse, scrolling through menus or touching a screen. The particular selected selector circuit, device or means is not consequential to this invention. While control panel 50 includes a front panel on which are mounted a plurality of selectors and indicia associated with the selectors, panel 50 could alternatively take many other forms. For example, panel 50 may be a display, such as a cathode ray tube or a flat screen or liquid crystal display, which visually displays selectors, parameter settings and indicia. The particular selected control panel circuit, device or means is not consequential to this invention.

The plurality of operating parameter selectors on panel 50 include a plurality of welding process selectors 60, 62, 64, 66, to enable the operator to select the desired welding process. AC TIG selector 60 allows the operator to select an AC TIG welding process; DC TIG selector 62 allows the operator to select a DC TIG welding process; AC STICK selector 64 allows the operator to select an AC STICK welding process; and DC STICK allows the operator to select a DC STICK welding process. The selectors to the left of memory selectors 90, 92, 94 and 96 in FIG. 2 are operable only when a TIG welding process has been selected, and the selectors to the right of memory selectors 90, 92, 94 and 96 are operable only when a STICK welding process has been selected. In this particular embodiment, the selectors each include an LED (e.g., LEDs 56, 58) which light when the selector is pressed. For the welding process selectors 60, 62, 64, 66, pressing one of the selectors will cause all other of the selector LEDs to turn off, since only one of these four welding processes may be selected at a time. When one of selectors 60, 62, 64, 66 is pressed, a signal is sent to control circuit 16 indicating the desired welding process, such that control circuit 16 can control device 10 to provide the necessary welding inputs for the selected process.

The operating parameters of the selected welding process can be further modified by adjusting others of the parameter selectors on control panel 50. To adjust the frequency of an AC welding process, the operator presses the AC frequency selector 68. In response, control circuit 16 sends a display signal to multi-purpose display 54 to cause display 54 to show the currently selected frequency. The operator may then adjust this frequency by rotating adjustment selector 70. In a similar manner, the electrode negative (EN)-to-electrode positive (EP) balance of the AC waveform can be adjusted by pressing the AC balance selector 72 and rotating adjustment selector 70. The start mode of the welding cycle may be selected by pressing one of lift arc selector 74 and high frequency start selector 76. Lift arc starting is performed by control circuit 16 enabling the welding current, the operator touching the electrode to the workpiece, and the operator lifting the electrode to form the arc. HF starting involves the use of a high frequency signal that initiates the arc by jumping the gap between the electrode and the workpiece.

Other parameter selectors in this embodiment include a pulse on/off selector 78, a pulses/second selector 80, a peak time selector 82 and a background amperage selector 84. When the operator presses pulse on/off selector 78 to enable a pulse mode of operation, control circuit 16 controls power circuit 20 to give a pulse of full amperage (the magnitude of which may be selected via a main/peak amperage selector 110 along with rotating adjustment selector 70), followed by a pulse of reduced amperage (the percentage of peak magnitude which may be selected via background amperage selector 84). The pulse frequency may be selected via pulses/second selector 80 and the peak time may be selected via peak time selector 82. This feature allows the weld puddle to solidify between filler wire applications, thus providing better puddle control and preventing the welder from melting holes in the workpiece.

A percent dig selector 86 and a STICK amperage selector 88 may be used to further optimize the welding process. Dig control increases the welding amperage at lower arc voltages to facilitate arc starting and to aid in making overhead and vertical welds. Dig control may also be desirable during STICK welding to prevent the electrode from sticking to the base metal or workpiece. STICK amperage selector 88 is used to select the welding current or amperage during STICK welding.

A plurality of memory selectors 90, 92, 94, 96 allow the operator to save in memory 18 various configurations of the parameter selectors. Each memory selector may be pressed to recall from memory 18 to control circuit 16 a set of previously selected or programmed operating parameters, some or all of which control circuit 16 can communicate to control panel 50 for display to the operator. Alternatively, pressing two selectors at once could recall yet another configuration of the parameter selectors.

A number of the parameter selectors are operable to control the welding current and the preflow and postflow of shielding gas for some welding processes. A preflow selector 98 allows the operator to adjust the amount of time that shielding gas will flow before an arc is struck. A postflow selector 100 allows the operator to adjust the amount of time that shielding gas will flow after the arc is extinguished. An initial amperage selector 102 allows the operator to adjust an initial current which is supplied to the arc before the welding current rises to its main/peak current, selected by main/peak amperage selector 110. This initial current provides a better start in TIG welding processes. A final amperage selector 104 allows the operator to adjust a final welding current which is supplied to the arc at the end of a welding cycle. An initial slope selector 106 allows the operator to adjust the slope with which the welding current will ramp upward from the initial current to the main/peak current. A final slope selector 108 allows the operator to adjust the slope with which the welding current will ramp downward from the main/peak current to the final current.

The remaining selectors in this embodiment are output control selectors 112, 114, 116, 118. If the operator wishes to use a remote control device (e.g., remote devices 29) during a STICK welding process, the operator presses on/remote selector 112 which indicates to control circuit 16 that a remote control device is to be used instead of a contactor on the STICK stinger. Output selectors 114, 116 and 118 are output control selectors for a TIG welding process. Remote selector 114 allows full remote device control over the TIG welding process, but the operator must hold the trigger throughout the weld cycle. A remote trigger hold selector 116 allows the operator to press and release the trigger of a remote device to initiate a weld cycle, and subsequently to press the trigger to end the weld cycle. Thus, the power supply "holds" the output on. A "4T" selector 118 allows the welder to press and hold a remote device trigger or pedal to start the gas preflow and the welding arc at the initial current selected by initial amperage selector 102. Then, upon release of the trigger or pedal, the welding arc ramps up to the main/peak welding current level, per selections by initial slope selector 106 and main/peak amperage selector 110. When the trigger or pedal is pressed again, the current level begins to decrease toward the final current, per selections by final slope selector 108 and final amperage selector 104. When the trigger or pedal is released again, the arc extinguishes and the gas postflow time begins, per postflow selector 100.

While one embodiment of control panel 50 has been shown and described with reference to FIG. 2, one skilled in the art will appreciate that control panel 50 may contain greater, fewer, or different selectors than those shown for adjusting the operating parameters of welding device 10. For example, an alternate embodiment of the present invention for a MIG welding device will include different parameter selectors (e.g., a wire feed speed selector) than those shown for the STICK/TIG welding device of this embodiment. Accordingly, the present invention is not intended to be limited by the specific welding device or operating parameters set forth in FIGS. 1 and 2.

With reference now to FIGS. 1 and 2, a method for controlling an operating parameter of a welding device according to one embodiment of the present invention will be described. Control circuit 16 provides control signals to power circuit 20 and shielding gas source 11 to cause circuit 20 and source 11 to provide a welding power and a shielding gas, respectively, to a welding site via terminals 24, 26. Control circuit 16 receives a remote device signal from one of remote devices 29 through remote control circuit 28. The remote device signal may be a digital signal (e.g., indicating a "1" or a "0" or a series of "1"s or "0"s), an analog signal, a DC-voltage level signal (e.g., 5 volts, 2 volts, etc.), an amplitude-, frequency- or phase-modulated signal, or other signal conveying information from one of remote devices 29 to control circuit 16. Remote control circuit 28 is provided in this embodiment (but may be absent in alternate embodiments in which control circuit 16 performs the functions of control circuit 28) to condition the remote device signal by suitable buffering, amplifying, etc., so that the remote device signal may be read by control circuit 16. Based on the received remote device signal, control circuit 16 determines the type of remote device present.

Control circuit 16 also receives an operating parameter signal from one of the parameter selectors of FIG. 2 (e.g., initial amperage selector 102), the parameter selector signal similarly being any type of signal conveying a selected value of the operating parameter from operator interface 14 to control circuit 16. Control circuit 16 controls an operating parameter of welding device 10 (e.g., initial amperage) with one of the parameter selector signal and the remote device signal. Control circuit 16 determines, based on the remote device signal, whether the remote device type is one suitable for controlling the selected operating parameter. For example, control circuit 16 may determine, based on the remote device signal, if the remote device is adapted for adjusting welding current in addition to starting and stopping the welding cycle or if remote device is only adapted for starting and stopping the welding cycle. In the case of the former, control circuit 16 will control the welding current based on the remote device signal determined by, for example, the degree of engagement of a trigger or pedal on the remote device.

Depending on the remote device type, control circuit 16 may also prevent the operator from selecting a desired value of the operating parameter using the parameter selector. For example, if control circuit 16 identifies a fingertip/foot control device, control circuit 16 disables operator selection of a desired initial amperage via initial amperage selector 102 to clearly indicate to the operator that welding current is to be controlled by the fingertip/foot control device. Alternatively, control circuit 16 may reconfigure the parameter selector to select a different parameter. For example, if control circuit 16 identifies a fingertip/foot control device, main/peak amperage selector 110 is reconfigured to select a maximum welding current parameter instead of the instantaneous welding current parameter.

Further still, control circuit 16 may control the operating parameter with one of the operating parameter selector signal and the remote device signal based on a welding process selector signal from a welding process selector. For example, if the operator selects a STICK welding process and control circuit 16 has identified a fingertip/foot control remote device, control circuit 16 may ignore the fingertip/foot control remote device and control the operating parameter with the operating parameter selector signal since STICK welding typically does not allow for use of a fingertip or foot control remote device.

The remote device signal in this embodiment is sent to remote control circuit 28 in response to a remote device test signal sent by control circuit 16 which is buffered through remote control circuit 28 and transmitted to one of remote devices 29. Control circuit 16 may send the remote device test signal periodically or constantly while the device is turned on, or may send the remote device test signal in response to the operator pressing one of the plurality of selectors on control panel 50 (e.g., on/remote selector 112). Alternatively, remote control device 29 may send the remote device signal periodically or in response to an operator pressing a trigger or pedal on remote control device 29. The remote device signal may indicate to control circuit 16 either that the remote device is present, or the remote device signal may indicate to control circuit 16 the remote device type (e.g., whether the remote device is configured to control the desired operating parameter).

Figure 3:
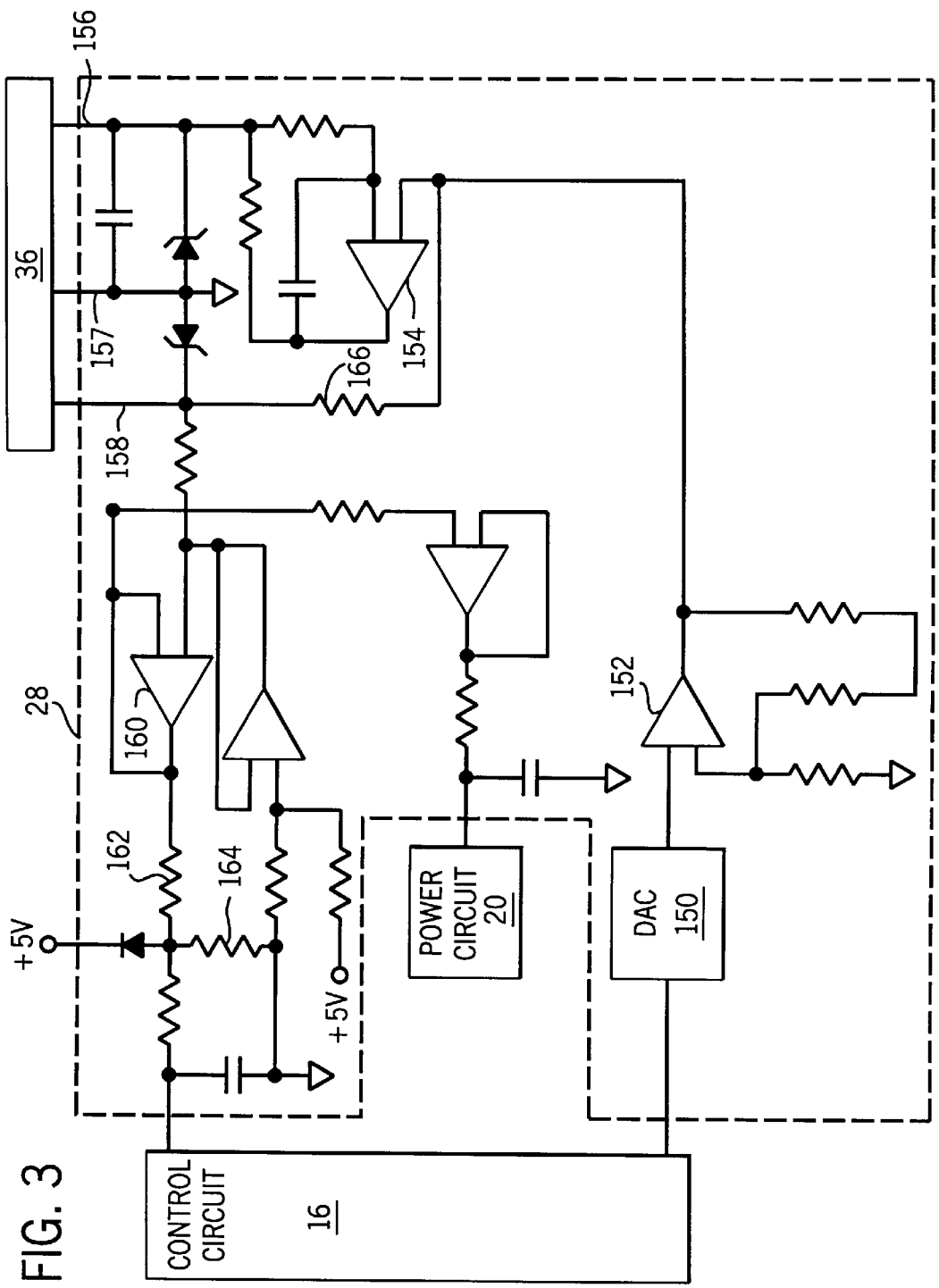
FIG. 3 is a circuit diagram of one of a number of possible remote control circuits of the welding device of FIG. 1.

Referring now to FIG. 3, a more detailed description of one embodiment of the present invention will be described. FIG. 3 shows control circuit 16, remote control circuit 28 and remote connector 36. Control circuit 16 sends a remote device test signal in digital format to a digital-to-analog converter (DAC) which converts the test signal to an analog format, e.g., a +10 VDC reference signal. This reference signal is buffered through operational amplifier 152 and sent through a second operational amplifier 154 to a first terminal 156 of remote connector 36. The off-state resistance of the remote device connected to remote connector 36 will determine the remote device signal that is returned to 25 circuit 28 via a second terminal 158 of remote connector 36. For example, if the remote device includes a potentiometer, terminal 156 is coupled to one end of the resistive element, ground terminal 157 is coupled to the other end of the resistive element, and terminal 158 is the wiper. When the remote device is in its off-state, terminal 158 is coupled to ground terminal 157, providing a 0 VDC remote device signal at terminal 158 (i.e., a full +10 VDC drop in potential across the resistive element from terminal 156 to ground terminal 157). The remote device signal then is buffered and scaled via operational amplifier 160 and resistors 162, 164 to provide a signal readable by an analog input of control circuit 16. Based on this signal, control circuit 16 determines the type of remote device coupled to connector 36, as will be described in an exemplary manner below. Alternatively, the full-on or partial-on state resistance of the remote device may determine the remote device signal, provided control circuit 16 is adapted to receive and determine the type of remote device based on said the full-on or partial-on state resistance of the remote device.

When control circuit 16 detects a remote device signal of approximately 0 VDC in the remote device off-state, control circuit 16 determines that the remote device is one of the fingertip/foot control remote devices capable of controlling welding current. If remote selector 114 is pressed (FIG. 2), control circuit 16 disables initial amperage selector 102, final amperage selector 104, initial slope selector 106, and final slope selector 108 since amperage control is performed by the remote device. Max/peak amperage selector 110 remains enabled but is reconfigured to allow the operator to select the maximum welding current commanded by the remote device (i.e., in its full on-state). However, if either of output control selectors 116 or 118 are pressed, selectors 102, 104, 106 and 108 will remain enabled and the remote device will operate as a trigger only remote device regardless of whether the remote device is capable of amperage control.

When control circuit 16 detects a remote device signal of more than 0 VDC but less than the remote device test signal voltage (e.g., +10 VDC), control circuit 16 determines that the remote device is a hand control remote device capable of setting welding current. In this case, all operating parameter selectors are enabled, max/peak amperage selector 110 selects the maximum welding current commanded by the remote device, and amperage control is performed by the remote device up to the selected maximum welding current.

When control circuit 16 detects a remote device signal approximately equal to the remote device test signal voltage (e.g., +10 VDC), control circuit 16 determines that either the remote device is a trigger only remote device or no remote device is coupled to connector 36. In this case, the +10 VDC reference is fed through resistor 166 to operational amplifier 160 as the remote device signal. Selectors 102, 104, 106, 108 and 110 control their respective operating parameters, and the remote device, if present, controls only the start and stop of the welding cycle.

STICK welding typically does not allow for use of a fingertip or foot control remote device. Accordingly, a further advantageous feature of the present invention is that control circuit 16 can detect when a fingertip or foot control remote device is present and ignore the remote device signal received from the fingertip or foot control remote device when the operator has selected a STICK welding process. In prior systems, the operator had to physically remove the fingertip or foot control remote device from the welding device or actuate a switch before beginning a STICK welding process.

While the embodiments illustrated in the FIGURES and described above are presently preferred, it should be understood that these embodiments are offered by way of example only. Many alternative embodiments of the present invention are contemplated based on the novel characteristics of the present welding device with remote device detection. For example, the concepts herein could be applied to a MIG welding device wherein the operating parameter selector selects the wire feed speed and an optional remote device may be coupled to the welding device to control the wire feed speed remotely. The invention is not limited to a particular embodiment, but extends to various modifications that nevertheless fall within the scope of the appended claims.

What is claimed is:

1. A method for controlling an operating parameter of a welding device, comprising:

receiving a welding process selector signal from a welding process selector, the welding process selector signal representing a desired welding process;

receiving a remote device signal from a remote control device, the remote device signal representing a first desired value of the operating parameter;

receiving an operating parameter selector signal from an operating parameter selector, the operating parameter selector signal representing a second desired value of the operating parameter; and controlling the operating parameter with the remote device signal when the welding process selector signal indicates a first welding process is desired and with the operating parameter selector signal when the welding process selector signal indicates a second welding process is desired.

2. The method of controlling of claim 1, wherein the first welding process is TIG and the second welding process is STICK.

3. The method of controlling of claim 1, further comprising:

providing a remote device test signal to the remote control device.

4. The method of controlling of claim 1, further comprising:

receiving an output control selector signal from an output control selector, the output control selector signal representing a desired operator control of the welding device; and controlling the operating parameter with the remote device signal when the output control selector signal indicates a first output control is desired and with the operating parameter selector signal when the output control selector signal indicates a second output control is desired.

5. The method of controlling of claim 4, wherein the first output control is a remote trigger hold output control and the second output control is a remote output control.

6. The method of controlling of claim 1, wherein the remote device signal indicates whether the remote control device is present.

7. The method of controlling of claim 1, wherein the remote device signal indicates whether the remote control device is configured to control the operating parameter.

8. The method of controlling of claim 7, wherein the operating parameter selector is an amperage selector and the operating parameter is welding current.

9. The method of controlling of claim 1, further comprising preventing operator selection of the second desired value of the operating parameter based on the remote device signal.

10. A welding device for providing a welding input to a welding site, comprising:

a power circuit configured to generate the welding input; and a control circuit configured to provide control signals to the power circuit and to receive a remote device control signal from a remote control device, the control circuit configured to determine the type of remote control device based on the remote device control signal.

11. The welding device of claim 10, the control circuit to provide a remote device test signal to the remote device.

12. The welding device of claim 10, further comprising an operating parameter selector to adjust an operating parameter of the welding device, the control circuit to receive an operating parameter selector signal from the operating parameter selector and to control the welding input with one of the operating parameter selector signal and the remote device control signal based on the remote device control signal.

13. The welding device of claim 12, further comprising an output control selector to adjust operator control over the welding device, the control circuit to receive an output control selector signal from the output control selector and to control the welding input with one of the operating parameter selector signal and the remote device control signal based on the remote device control signal and the output control selector signal.

14. The welding device of claim 12, wherein the operating parameter selector is an amperage selector and the welding input is welding current.

15. The welding device of claim 12, the control circuit to prevent operator selection of a desired value of the welding input using the operating parameter selector based on the remote device control signal.

16. The welding device of claim 12, the control circuit to reconfigure the operating parameter selector based on a selected welding process.

17. The welding device of claim 10, the control circuit to determine whether the remote control device is configured to control the welding input based on the remote device control signal.

18. The welding device of claim 10, the control circuit to control the welding input based on the remote device control signal.

19. The welding device of claim 10, further comprising a remote control circuit coupled to the control circuit, the remote control circuit configured to receive the remote device control signal from the remote control device, to condition the remote device control signal, and to provide the conditioned remote device control signal to the control circuit.

20. A welding device for providing a welding input to a welding site, comprising:

an operating parameter selector to adjust an operating parameter of the welding device; and a control circuit in communication with the operating parameter selector and configured to receive a remote device control signal from a remote control device, the control circuit to selectively enable and disable the adjustment of the operating parameter based on the remote device control signal.

21. The welding device of claim 20, the control circuit to receive an operating parameter selector signal from the operating parameter selector and to control the operating parameter with one of the operating parameter selector signal and the remote device control signal based on the remote device control signal.

22. The welding device of claim 20, further comprising an output control selector to adjust operator control over the welding device, the control circuit to receive an output control signal from the output control selector and to control the operating parameter with one of the operating parameter selector signal and the remote device control signal based on the remote device control signal and the output control signal.

23. The welding device of claim 20, wherein the control circuit reconfigures the operating parameter selector to adjust a second operating parameter based on the remote device control signal.

24. The welding device of claim 23, wherein the remote device control signal indicates the remote device is one of a fingertip control remote device and a foot control remote device and the second operating parameter is a maximum welding current.

* * * * *